UNITED STATES PATENT OFFICE.

ROBERT W. PATTEN, OF NEW YORK, N. Y.

IMPROVEMENT IN CEMENTS FOR MENDING CHINA, GLASS, &c.

Specification forming part of Letters Patent No. 124,617, dated March 12, 1872.

*To all whom it may concern:*

Be it known that I, ROBERT W. PATTEN, of the city, county, and State of New York, have invented a new and useful Cement for mending and cementing glass, china, marble, coral, pearl, horn, shell, rubber, jet, wood, alabaster, composition articles, and other similar hard and not easily joined substances; and I hereby declare the following to be a full and exact description of the same.

There has been a large number of cements presented to the public, but I believe prior to mine none that would with efficiency unite pieces of glass, china, and the like materials named above. It frequently happens that articles highly prized either for their intrinsic value or from their associations and connections are broken. A good cement, which would mend such articles without essentially marring them, has heretofore been much desired, and previous to my invention not attained. I have carefully tested my composition and know that it will do what I claim for it; that it will cement pieces of glass, china, marble, and many other articles, so that the fact that they have been broken is scarcely to be recognized.

The basis of my compound is bleached and refined shellac dissolved in alcohol. The ordinary shellac will not answer the purpose. To the shellac solution I add a jelly of Spanish isinglass, which is a firm strong gelatine.

The method which I prefer in preparing my composition is to fill a vessel from one-half to two-thirds full of the bleached shellac in small pieces, or in powder, and then fill up the vessel with alcohol of ninety-four to ninety-eight per cent. pure alcohol. This soon cuts and dissolves the shellac. When the solution is complete I add a jelly of the best Spanish isinglass, which unites with the shellac solution and forms the cement, which is of the consistency of thin sirup.

Having thus described my invention, what I claim, and desire to secure by Letters Patent of the United States, is—

The improved cement herein described, prepared of the materials in the manner set forth.

ROBERT W. PATTEN.

Witnesses:
T. C. CONNOLLY,
JNO. D. PATTEN.